UNITED STATES PATENT OFFICE.

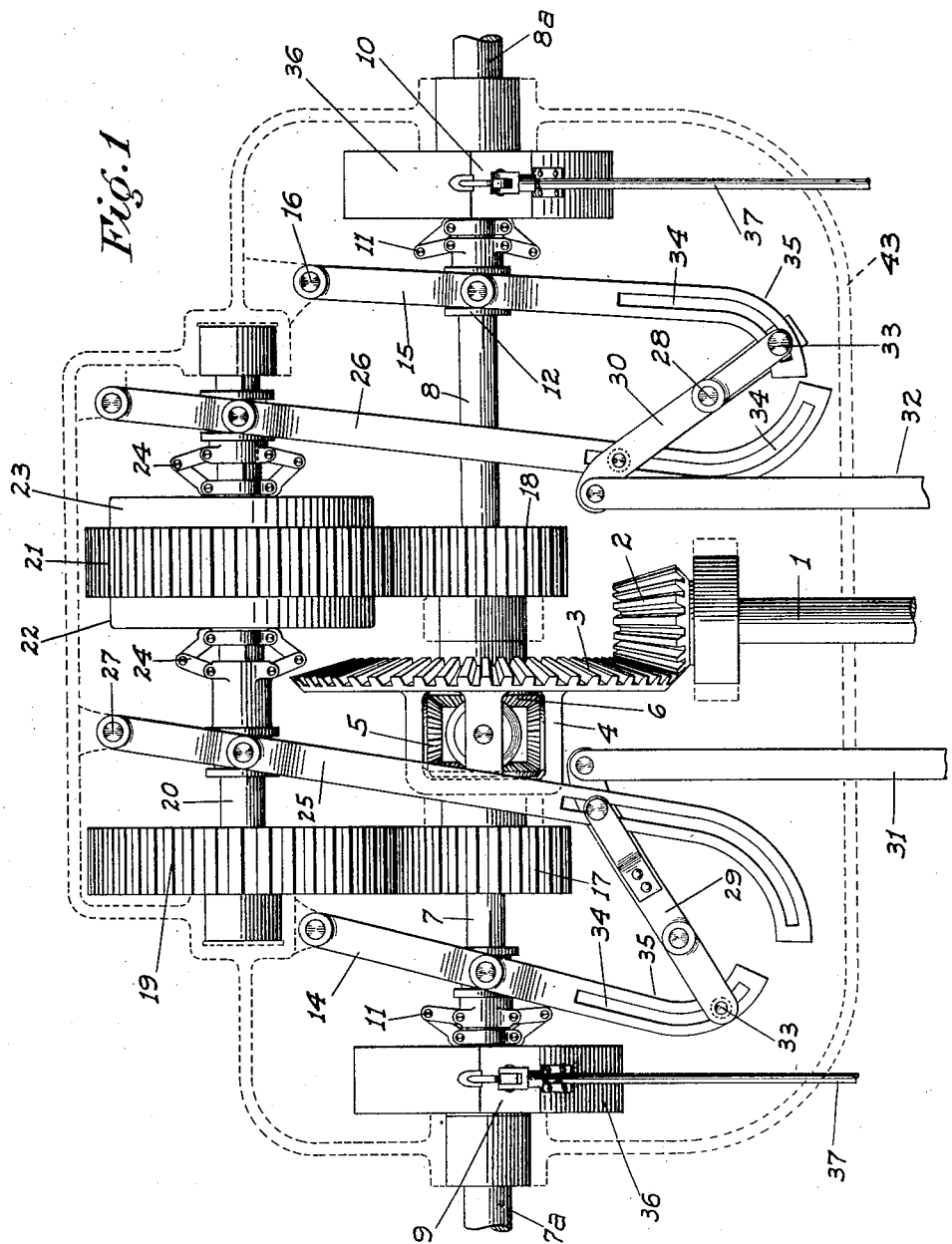

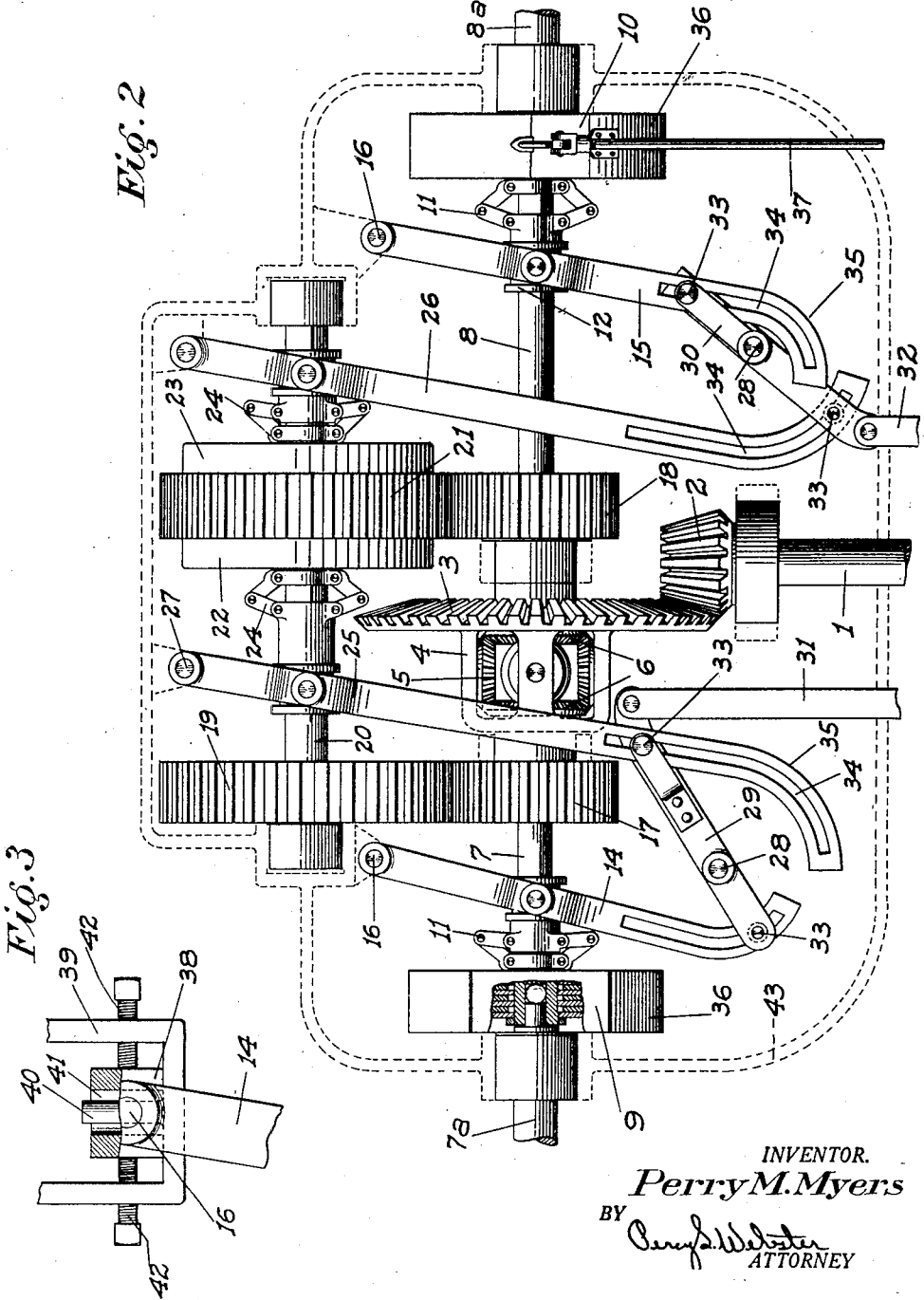

PERRY M. MYERS, OF LOCKEFORD, CALIFORNIA.

COMBINED DIFFERENTIAL AND CLUTCH TRANSMISSION.

1,336,532.  Specification of Letters Patent.  Patented Apr. 13, 1920.

Application filed April 22, 1919. Serial No. 291,857.

*To all whom it may concern:*

Be it known that I, PERRY M. MYERS, a citizen of the United States of America, residing at Lockeford, in the county of San Joaquin, State of California, have invented a certain new and useful Combined Differential and Clutch Transmission; and I do declare the following to be a clear, full, and exact description of the same, reference being had to the accompanying drawings, and to the characters of reference marked thereon, which form a part of this application.

This invention relates to a combined differential and clutch mechanism, the same being particularly adaptable to be used on tractors and the like, the principal object of the invention being to produce a mechanism whereby the axle of the driving wheels will be normally controlled by the ordinary differential principle as used in motor vehicles, but when it is desired to make a turn, one of the wheels will be held against rotation while the full driving power is applied to the other.

Another object is to provide a common means whereby one wheel may be held while the other is thrown into direct driving relation with the power.

A still further object of the invention is to produce a simple and inexpensive device and yet one which will be exceedingly effective for the purposes for which it is designed.

These objects, I accomplish by means of such structure and relative arrangement of the parts as will fully appear by a perusal of the following specification and claims.

On the drawings, similar characters of reference indicate corresponding parts in the several views.

Figure 1 is a top plan view of my device with the housing therefor in dotted lines, showing the parts in their normal running position.

Fig. 2 is a similar view showing one of the wheels thrown out of driving relation with the propeller shaft.

Fig. 3 is a fragmentary view of a lever adjustment means.

Referring now more particularly to the characters of reference on the drawings, the numeral 1 designates the propeller shaft from the power plant of the vehicle, having the usual bevel driving gear 2 thereon meshing with the drive gear 3 attached to which is the differential cage 4 in which are the usual differential gears 5. Gears 6 mesh with these gears and to each is secured one end of stub shafts 7 and 8, beyond which project the wheel shafts $7^a$ and $8^a$. Between the ends of these shafts are friction clutches 9 and 10 respectively, adapted to be thrown in or out by means of toggle joint connections 11, slidable on the shafts in the usual manner. These connections have grooved sleeves 12 in which are the usual collars of lever arms 14 and 15 respectively, pivoted to the rear of the shafts as at 16.

Keyed to the shafts 7 and 8 are pinions 17 and 18 respectively, the gear 17 meshing with a pinion 19 keyed to a jackshaft 20 extending parallel to the shafts 7 and 8 to the rear of the same. The pinion 18 meshes with a gear 21 of the same size on the shaft 20, but the latter gear is loose on the said shaft, being adapted to be in driving relation therewith at predetermined times by means of friction clutches 22 and 23, one on each side of the same.

These clutches have the usual grooved collar toggle throwing-connections 24, to which are operatively connected levers 25 and 26 respectively, pivoted to the rear of the same as at 27.

Pivoted between each pair of the levers 14 and 25, and 15 and 26, as at 28, are lever arms 29 and 30 respectively, being connected at one end to hand lever rods 31 and 32, extending to any suitable location on the vehicle. Pins 33 on the arms 29 and 30 are adapted to ride in slots 34 provided in the levers 14, 25, 15 and 26. The lower ends of these four levers and the slots therein are curved as at 35 about the pivotal point 28 of the arms 29 and 30 as an axis, for a purpose as will appear. These lever units are so connected and arranged that normally both the clutches 22 and 23 will be thrown out while the clutches 9 and 10 are in driving connection with the shafts 7 and 8.

Brake bands 36 may also be provided on the outside of the clutches 9 and 10 if desired, operatively connected to rods 37 whereby the shafts 7 or 8 may be positively held against turning when the clutches 9 or 10 are thrown out.

In order to adjust the pivotal points of the levers 14 and 15, etc., when necessary to offset wear in the toggles or clutches, I may mount each such pivotal point in a block 38 slidable on a frame 39 and held against vertical movement by means of a pin 40 secured to the frame and passing through a slot 41 in the block 38. Transverse or lateral adjustment of the block may be had by means of set screws 42 on both sides thereof impinging against the block.

A housing casing 43 of any suitable shape provides bearings for the various levers and shafts, and surrounds and incloses the entire mechanism, with the exception of course of the hand lever rods and wheel shafts, which must necessarily project through the same.

The operation of the device is as follows: When the vehicle is traveling along in a substantially straight path, the power line is from the shaft 1 through the gears 2 and 3, differential 4, 5, 6 to shafts 7 and 8, through clutches 9 and 10 and out to the shafts 7$^a$ and 8$^a$ and the wheels attached to these shafts. Under these conditions, as heretofore stated, the clutches 22 and 23 are both thrown out while the clutches 9 and 10 are thrown in and the gear 21 is merely an idler.

Supposing now (referring to Fig. 2) it is desired to throw the shaft 8$^a$ out of driving relation with the propeller shaft 1 while at the same time causing the other shaft to continue its turning movement.

The hand lever 32 is pulled, which causes the arm 30 to reverse its position, the pins 33 traveling in the slots 34 of the levers 26 and 15, causing these levers to move and throw the clutch 23 in and the clutch 10 out. Owing to the curved ends of these levers, it will be noted that the clutch 23 is thrown in before the clutch 10 is thrown out, or while the pin 33 is traversing the curved portion of the lever 15.

Similarly on the return movement of the arm 30, the pin 33$^a$ moving in the curved slot 34 thereof causes the clutch 23 to be held in until the clutch 10 is also thrown in, when the clutch 23 is thrown out.

If it were not for this feature, that is, if the clutch 23 were thrown out first, the gear 21 would become an idler before the shaft 8 was in driving connection with its wheel shaft 8$^a$, and the same would merely spin, and motion to the shaft 7 would cease temporarily.

The line of power is then from the propeller shaft 1, through gears 2 and 3, gears 5 and 6, shaft 8, pinion 18, gear 21, shaft 20, gear 19, pinion 17 and to shaft 7 to turn the same.

It will of course be evident that under the ordinary working principle of the differential 4—5, as soon as the shaft 8$^a$ is released from a frictional grip with the ground by throwing out the clutch 10, the driving power to the shaft 7 is lost also. Hence, the interposition of the gears 18, 21, etc., which neutralizes the loss of power of the differential.

It will also be evident that the same action on the opposite side takes place if the clutch 9 is thrown out by the lever 31 instead of the clutch 10.

Thus, from the foregoing description it will readily be seen that I have produced such a device as substantially fulfils the objects of the invention, as set forth herein.

While this specification sets forth in detail the present and preferred construction of the device, still in practice, such deviations from such detail may be resorted to as do not form a departure from the spirit of the invention, as set forth in the appended claims.

Having thus described my invention, what I claim as new and useful and desire to secure by Letters Patent is:—

1. A combined differential and transmission mechanism comprising in combination with a driven gear, a differential operatively mounted therewith, and axles operatively connected with said differential; pinions on the axles, a jackshaft parallel thereto, gears on the jackshaft meshing with the pinions, one of the gears being keyed to the shaft and the other one turnable thereon, a clutch on each side of said turnable gear, a clutch on each axle beyond the pinions thereon, either of a corresponding pair of clutches at a time being disengaged, and a common means for each axle clutch and the corresponding clutch on the jackshaft whereby the disengaged clutch will be thrown in and the other clutch then disengaged.

2. A combined differential and transmission mechanism for motor vehicles comprising in combination with a driven gear, a differential operatively mounted therewith, axles mounted in operative connection with said differential, pinions secured to the axles, a jackshaft parallel to and spaced therefrom, gears on the jackshaft meshing with the pinions, one of the gears being keyed to the shaft and the other turnable thereon, a clutch on each side of said turnable gear, a clutch on each axle beyond the pinions thereon, and a common means for each such last named clutch and the corresponding clutch on the jackshaft whereby one of the axle clutches may be thrown out while the corresponding clutch on the jackshaft is thrown in to transmit the power from the idle axle to the axle on the opposite side of the differential.

3. A combined differential and transmission mechanism for motor vehicles comprising in combination with a driven gear, a differential operatively mounted therewith, axles mounted in operative connection with said differential, pinions secured to the axles, a jackshaft parallel to and spaced therefrom, gears on the jackshaft meshing with the pinions, one of the gears being keyed to the shaft and the other turnable thereon, a clutch on each side of said turnable gear, a clutch on each axle beyond the pinions thereon, a lever mounted to move each clutch, and a common lever arm attached to each corresponding pair of levers and operatively connected to throw the corresponding clutches on the axle and jackshaft in opposite directions.

In testimony whereof I affix my signature in presence of a witness.

PERRY M. MYERS.

Witness:
　VERADINE WARNER.